(12) United States Patent
Petersen et al.

(10) Patent No.: US 7,007,914 B2
(45) Date of Patent: Mar. 7, 2006

(54) SLURRY MIXER CONSTRICTOR VALVE

(75) Inventors: Bruce Lynn Petersen, Lisle, IL (US); Richard James Haszel, Mundelein, IL (US); James R. Wittbold, Des Plaines, IL (US)

(73) Assignee: United States Gypsum Company, Chicago, IL (US)

( * ) Notice: Subject to any disclaimer, the term of this patent is extended or adjusted under 35 U.S.C. 154(b) by 68 days.

(21) Appl. No.: 10/846,131

(22) Filed: May 14, 2004

(65) Prior Publication Data

US 2005/0253098 A1   Nov. 17, 2005

(51) Int. Cl.
  *F16K 7/04*   (2006.01)

(52) U.S. Cl. ........................................................ 251/4
(58) Field of Classification Search .................... 251/4, 251/212; 417/477.1, 477.4
  See application file for complete search history.

(56) References Cited

U.S. PATENT DOCUMENTS

| 3,329,390 A | * | 7/1967 | Hulsey ........................... 251/4 |
| 4,836,149 A | * | 6/1989 | Newbold .................. 123/44 R |
| 5,769,389 A | * | 6/1998 | Jacobsen et al. ....... 251/129.06 |
| 6,923,421 B1 | * | 8/2005 | Raftis ............................ 251/4 |

* cited by examiner

*Primary Examiner*—Edward K. Look
*Assistant Examiner*—John K. Fristoe, Jr.
(74) *Attorney, Agent, or Firm*—Greer, Burns & Crain, Ltd.; David F. Janci; Michael Geoffrey

(57) ABSTRACT

An apparatus and method for controlling the flow of a slurry is provided which includes using a constrictor valve on a mixing and dispensing apparatus. The constrictor valve includes a first guide plate and a second guide plate that are spaced a distance apart along the length of the conduit. Extending between the two guide plates, a plurality of elongate members have first and second ends engaged on the first and second guide plates. Upon rotation of at least one of the first and second guide plates, the elongate members are configured to impart pressure on, and constrict the conduit.

20 Claims, 9 Drawing Sheets

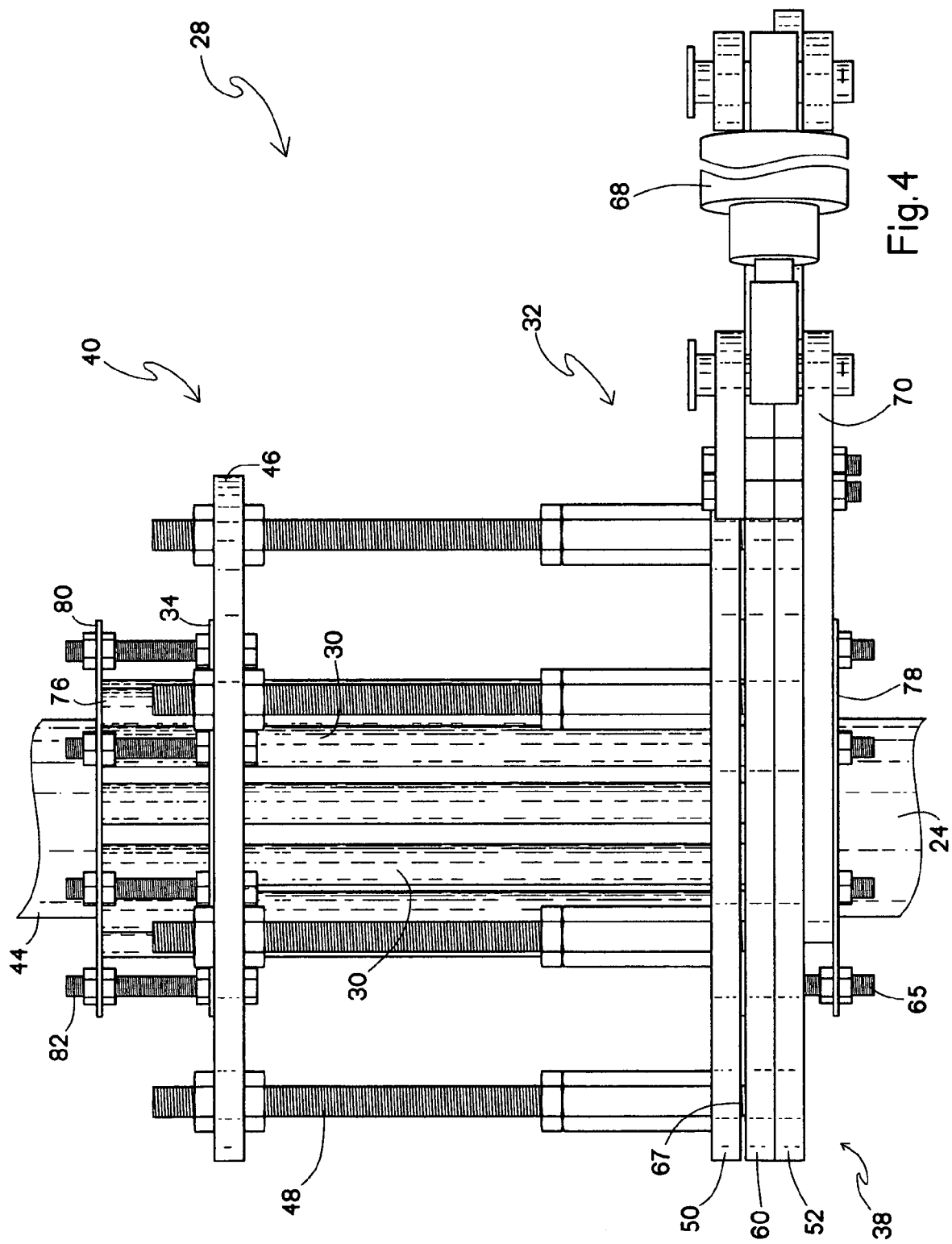

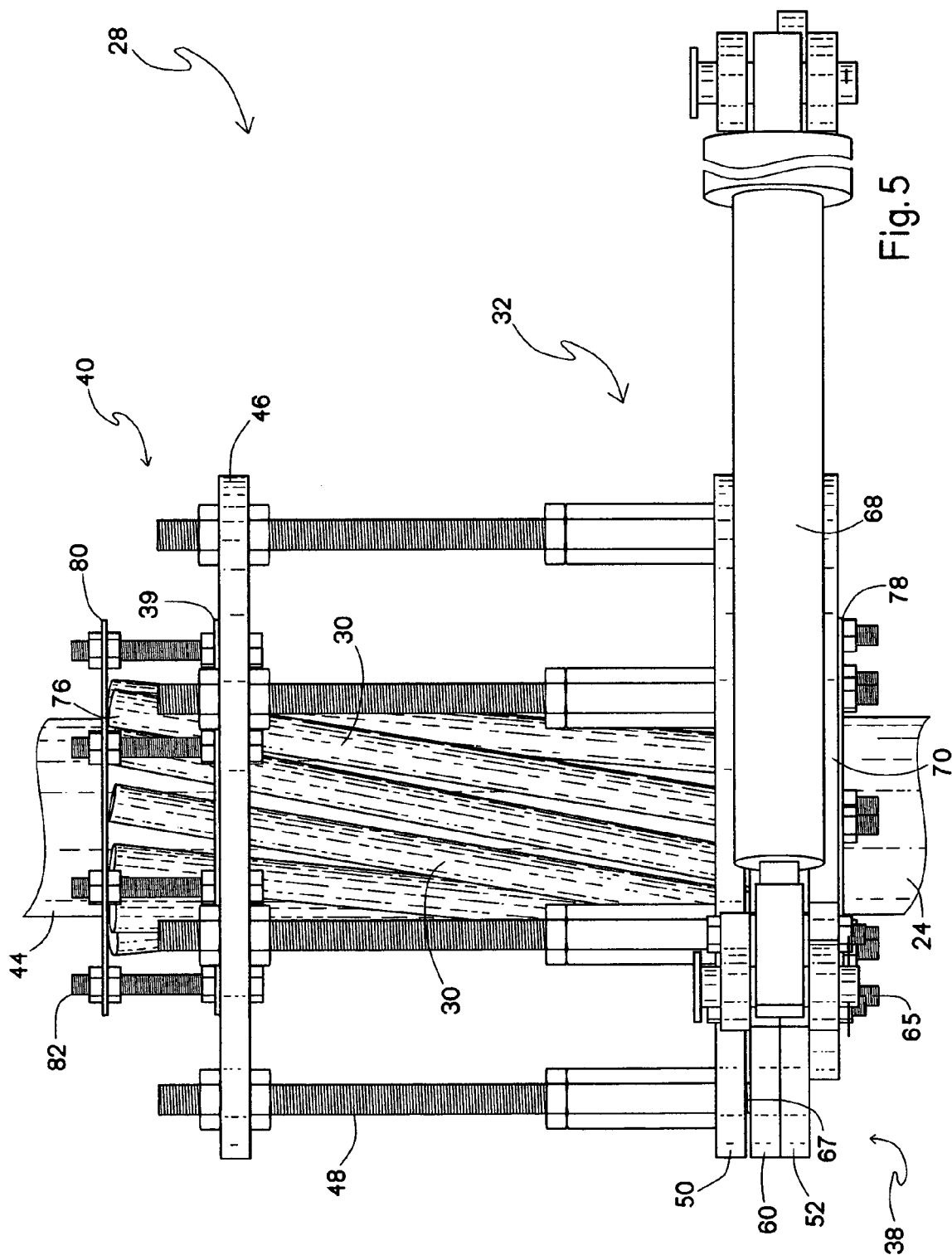

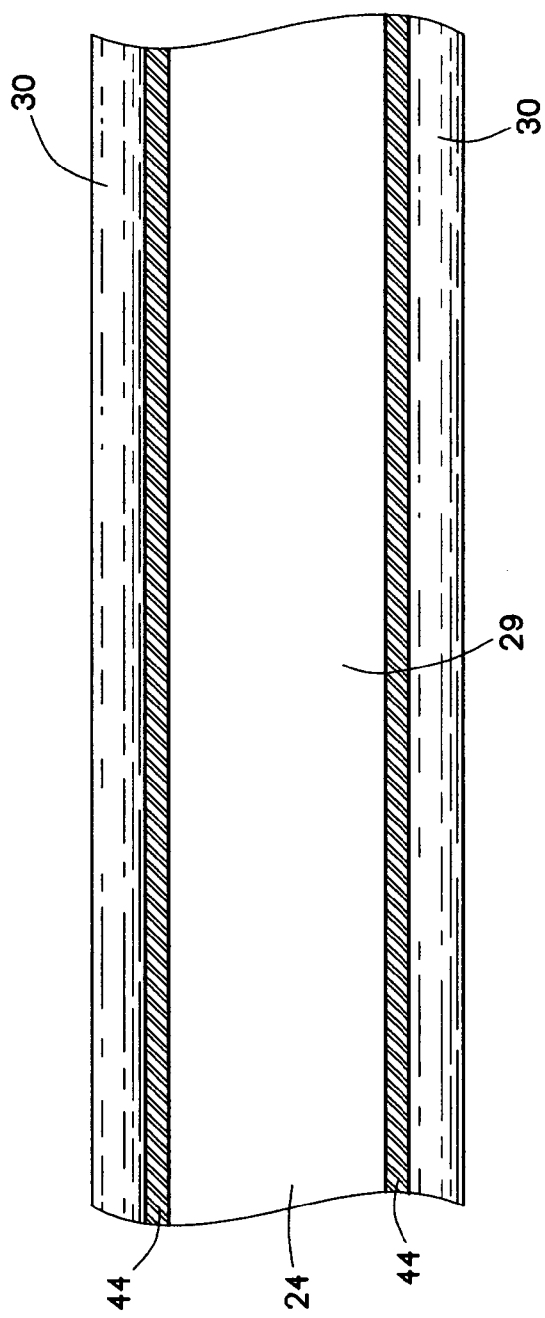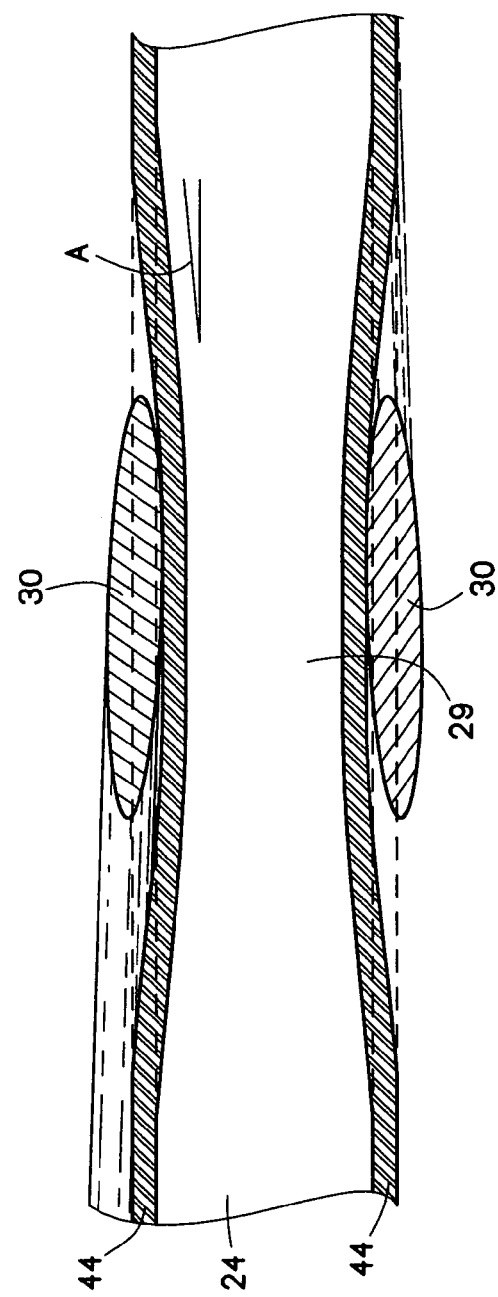

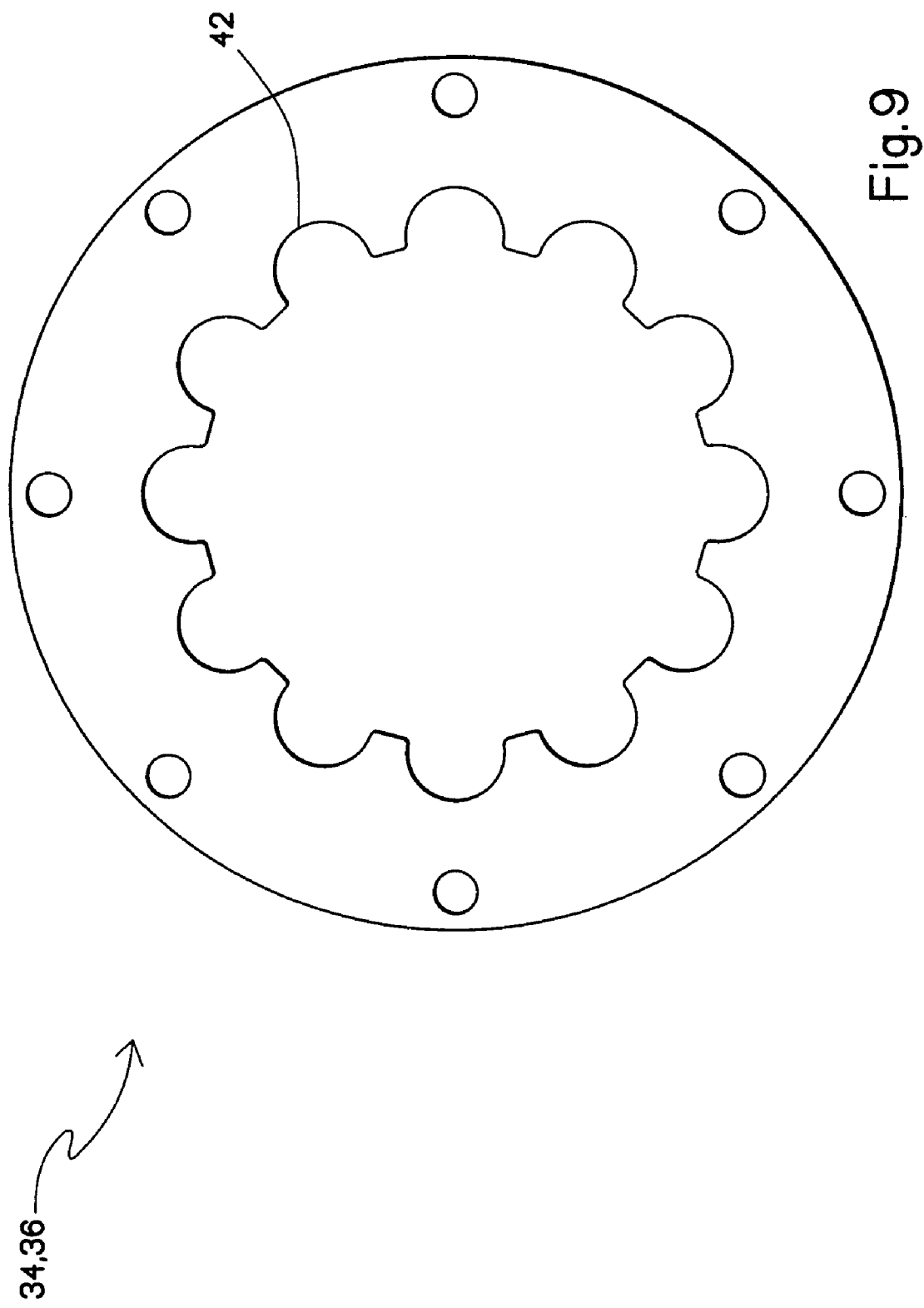

SLURRY MIXER CONSTRICTOR VALVE

BACKGROUND ART

The present invention relates to a method and apparatus for preparing gypsum products (i.e., products comprising calcium sulfate dihydrate) from starting materials comprising calcined gypsum (i.e., calcium sulfate hemihydrate) and water. More particularly, the present invention relates to an improved valve on a conduit located downstream of the slurry mixer and typically used to supply agitated gypsum slurry to a wallboard production line. The basic technology of gypsum wallboard manufacture is disclosed in U.S. Pat. Nos. 1,500,452; 2,207,339 and 4,009,062 all of which are incorporated by reference herein. The present apparatus provides an improved flow of slurry from the dispensing system which enhances the uniform smoothness of the gypsum slurry at the wallboard production line.

It is well known to produce gypsum products by uniformly dispersing calcined gypsum in water to form a slurry and then casting the slurry into a desired shaped mold or onto a surface and allowing the slurry to set to form hardened gypsum by reaction of the calcined gypsum (calcium sulfate hemihydrite or anhydrite) with the water to form hydrated gypsum (calcium sulfate dihydrate).

A gypsum wallboard mixer typically includes a housing defining a mixing chamber with inlets for receiving calcined gypsum and water, among other additives well known in the art. The mixer includes an impeller or other type of agitator for agitating the contents to be mixed into a mixture or slurry. The discharge gate or extractor controls the flow of slurry from the mixer to the dispensing system.

Slurries exhibiting certain viscosities or other properties require differing amounts of materials, additives, entrained air, and the like, and may also require different processing times and equipment. In setting slurry requiring a low amount of entrained air, it is known to use a "pinch-type" valve that squeezes an elastomeric conduit carrying the slurry. Squeezing down on the conduit reduces the orifice of the conduit, which in turn, increases the pressure drop through the orifice, increases the back pressure, increases the volume of slurry in the mixer, and accelerates the flow through the conduit. This will result in a smoother, less air entrained, and more desirable slurry for certain applications.

Prior apparatuses for addressing some of the operational problems associated with dispensing a smooth, setting slurry include a "pinch-type" valve which can be mechanically operated or operated by compressed air or hydraulics to "pinch" down on the elastomeric conduit. However, the pinch valve deforms the conduit into a flattened or rectangular orifice which is susceptible to plugging from prematurely setting slurry in the flow, particularly in the corners of the orifice, where the flow velocity is lower. Further, the inlet and outlet orifices of the pinch valve are abrupt because pressure is exerted on the conduit in a substantially singular plane and does not allow for a gradual transition. Such abrupt entrances and exits can lead to further plugging of slurry producing equipment, which causes costly downtime for repairs.

Muscle valves, consisting of a hydraulic chamber around a thick elastomeric sleeve, provide a round orifice but an abrupt flow channel since the pressure is exerted in a substantially singular plane or at one point along the conduit. Further, the muscle valves frequently are massive in size which limits the operator's access to the orifice for clearing a plug or buildup, or for general observation of the flow of slurry through the channel itself.

Plunger-type valves, knife gate valves, and custom made restrictors having an action similar to a "garotte" are also known. Similar problems are seen in the use of these valves as are exhibited with the muscle valves and the pinch valves. In particular, solids easily build up, forming crystalline gypsum, which then prematurely sets and causes further clogging of the apparatus.

Further, the prior art valves cannot easily reproduce exact settings which correspond to a given amount of restriction of the conduit. Further still, the prior art valves do not have interchangeable parts, nor are they adapted to be used with different sized conduits.

Accordingly, there is a need for an improved valve for a slurry mixing apparatus dispensing system and a method which promotes smoother, less air entrained slurry.

Another need is for an improved valve for a slurry mixing apparatus dispensing system which prevents build up of prematurely set slurry in the dispensing conduit.

Still another need is for an improved valve and method of use which is capable of continuously varying the flow of gypsum slurry from the mixing apparatus through the dispensing system to the production line.

A further need is for an improved valve system for a gypsum slurry mixing apparatus dispensing system and method of use which has parts that are readily adaptable to different sized conduits.

A further need is for an improved valve for a gypsum slurry mixing apparatus and dispensing system and method of use which provides an easily accessible mechanism for changing the volume of slurry emitted from the dispensing system.

DISCLOSURE OF THE INVENTION

Accordingly, the above-listed needs are met or exceeded by the present apparatus and method for controlling the flow of a slurry including the feature of using a constrictor valve on a mixing and dispensing apparatus. The mixing apparatus is used to mix and agitate calcined gypsum and water to form an aqueous dispersion or slurry of the calcined gypsum. After the contents are agitated, the contents are passed through the outlet of the mixer to the dispensing apparatus. The dispensing apparatus preferably includes an elongate, preferably flexible conduit which provides additional space for the uniform mixing of slurry. By providing the constrictor valve on the flexible conduit, a back-pressure is created on the mixture causing an increase in the volume of the mixture in the mixer when the conduit is constricted. Unwanted premature setting of gypsum is prevented when the conduit is constricted so that occurrences of lumps are reduced.

In the preferred embodiment, the constrictor valve includes a first guide plate and a second guide plate that are spaced a distance apart along the length of the conduit. Extending between the two guide plates, a plurality of elongate members have first and second ends engaged on the first and second guide plates. Upon rotation of at least one of the first and second guide plates with respect to each other, the elongate members are configured to impart pressure on, and constrict the conduit. The elongate guide members are preferably rigid rods that are arrayed around the conduit and are configured to impart pressure on and constrict the conduit.

More specifically, upon actuation by an actuator, at least one of the first and second guide plates rotates relative to the other plate about the longitudinal axis of the conduit. The circumferential displacement of the first end of the elongate member with respect to the second end of the elongate member causes the shape of the conduit to approximate a hyperboloid of rotation. Pressure is imparted on and constricts the conduit radially along the length of the conduit in multiple planes. The resulting shape of the conduit is generally smooth and circular at a plurality of cross-sections taken along the length of the conduit, and is preferably generally smooth and circular at any cross-section taken along the length of the conduit.

Another feature of the present invention is the inclusion of an actuator to rotate the first guide plate relative to the second guide plate. It is preferred that the amount of relative rotation between the guide plates of the constrictor valve is continuously variable, and can be either manually or automatically controlled.

BRIEF DESCRIPTION OF THE OF THE SEVERAL VIEWS OF THE DRAWINGS

FIG. 4 is an overhead plan view of the constrictor valve of FIG. 1 shown in a relaxed position;

FIG. 5 is an overhead plan view of the constrictor valve of FIG. 1 shown in an actuated position;

FIG. 6 is a cross-section taken along the longitudinal axis of the constrictor valve of FIG. 1 and shown in a relaxed position;

FIG. 7 is a cross-section taken along the longitudinal axis of the constrictor valve of FIG. 1 and shown in an actuated position;

FIG. 9 is a plan view of the scallop plate of the present invention.

BEST MODE OF CARRYING OUT THE INVENTION

Figure 1:
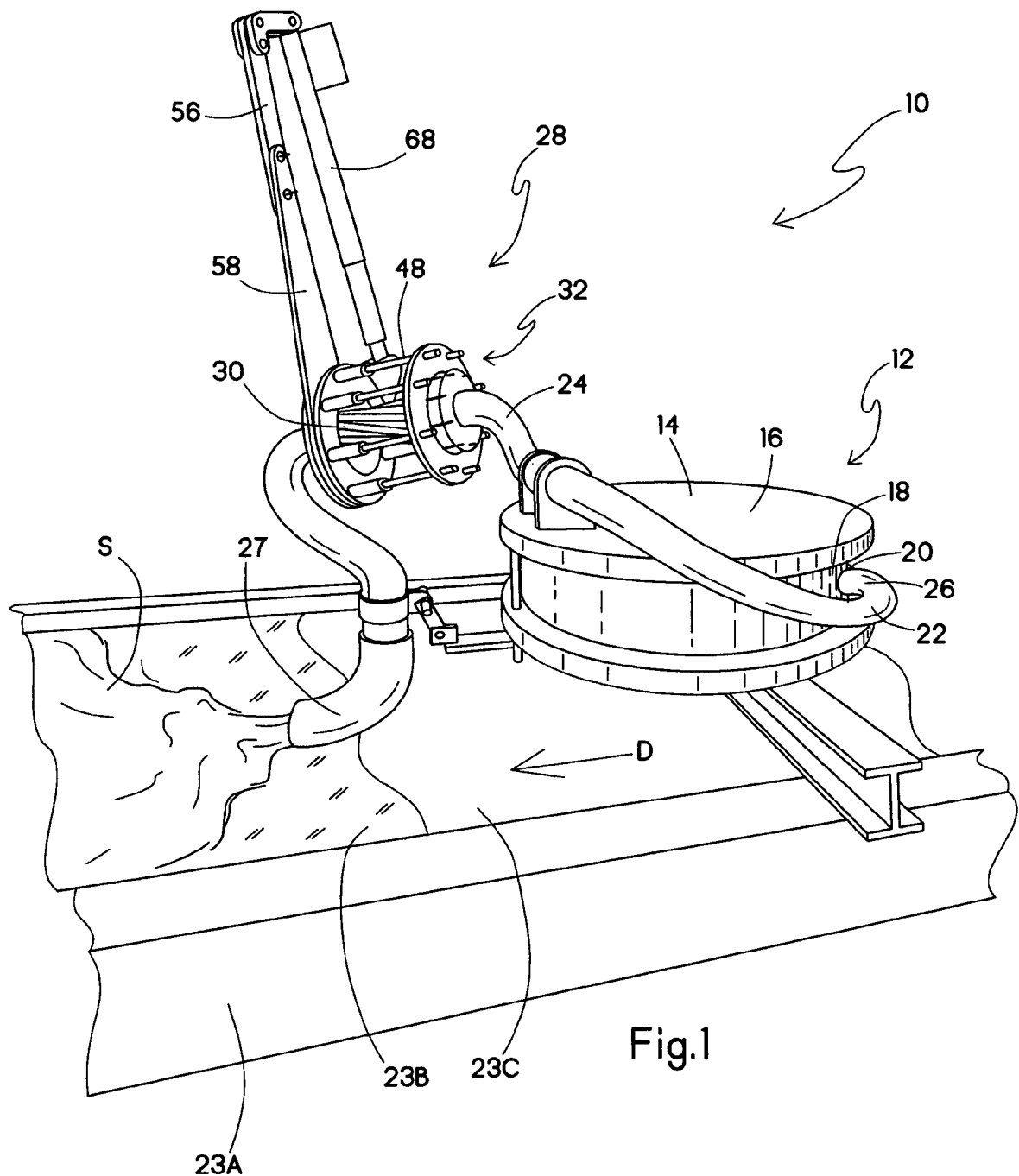
FIG. 1 is a fragmentary schematic overhead plan view of a mixing apparatus incorporating the constrictor valve of the present invention.

Referring now to FIG. 1, a mixing apparatus for mixing and dispensing a slurry is generally designated 10 and includes a mixer 12 having a mixer motor 13 and a housing 14 configured for receiving and mixing the slurry. The housing 14 defines a chamber (not seen) for holding the slurry, and has a preferably generally cylindrical shape. The housing 14 has an upper wall 16, a lower wall (not seen) and an annular peripheral wall 18. Calcined gypsum and water, as well as other materials or additives often employed in slurries to prepare gypsum products, are mixed in the mixing apparatus 10.

An outlet 20, also referred to as a mixer outlet, a discharge gate or a slot, is provided in the peripheral wall 18 for the discharge of the major portion of the well-mixed slurry into what is generally referred to herein as a dispensing apparatus 22.

The dispensing apparatus 22 includes an elongate, preferably cylindrical flexible, resilient tube or conduit 24 having a main inlet 26 in slurry receiving communication with the mixer outlet 20.

The dispensing apparatus 22 is shown disposed above a conventional gypsum wallboard line including a conveyor table 23A upon which a web of face paper 23B is moved upon a conveyor belt or web 23C in a direction designated by the arrow D. The mixer 12 is shown supported by a frame member, which can be any sort of frame or platform sufficient for supporting the mixer and other associated equipment as is known in the art.

In some applications, slurry S is dispensed from an outlet or spout 27 upon the web of paper 23B.

In operation, it will be seen that a method for providing a smooth slurry to a web is provided, including inserting calcined gypsum and water into the mixer 12, agitating the contents of the mixer to form an aqueous dispersion of the calcined gypsum, emitting the agitated contents from the outlet 20 of the mixer 12, passing the agitated contents into the main inlet 26 of the dispensing apparatus 22, creating a backpressure on the mixture and reducing the amount of mixture in the mixer 12 by constricting the conduit with a constrictor valve of the present invention, generally designated 28. The slurry pressure in the mixer is increased by the constrictor valve 28 which created a Venturi-shaped orifice 29 in the conduit 24 which may be variably reduced in diameter.

Generally, the longer the conduit 24, and in particular, the longer the portion of the conduit confined within the constrictor valve 28, the less air entrained and the smoother the slurry. Smooth slurry typically has less uncontrolled entrained air and less lumps of partially congealed slurry. The benefits of improved slurry smoothness achieved by the present invention include: reduction and/or elimination of blisters in the board; uniformity of the board, leading to improved strength; and potential water reduction from the board formulation, which in turn will lead to energy savings in the kiln or an increase in line speed.

The conduit 24 is preferably a flexible hose of elastomeric material, such as Tygon® tubing or the like, and is of sufficient strength and flexibility, that upon being subjected to radial pressure, is capable of being reduced in size to approximately one-half the original diameter. Alternatively, any tubing exhibiting elastic properties is contemplated, and further, any reduction in orifice surface area that does not detrimentally affect the integrity of the conduit 24 is contemplated. Preferably, conduits having a diameter ranging between one to three inches and having a wall thickness of approximately ¼-inch are employed, however other diameters and wall thicknesses are contemplated to suit the application.

Factors which influence the particular thickness and configuration of the conduit 24 employed include, among other things, the thickness of the wallboard being produced, the amount of slurry required, the distance between the mixer 12, the mixer outlet 20 and the wallboard forming plate, and the particular characteristics of the slurry formulation, including the setting rate, the water/stucco ratio, glass fiber usage and the percentage of foam desired. One conduit size may be more successful than others, depending on the particular wallboard production line.

Figure 2A:
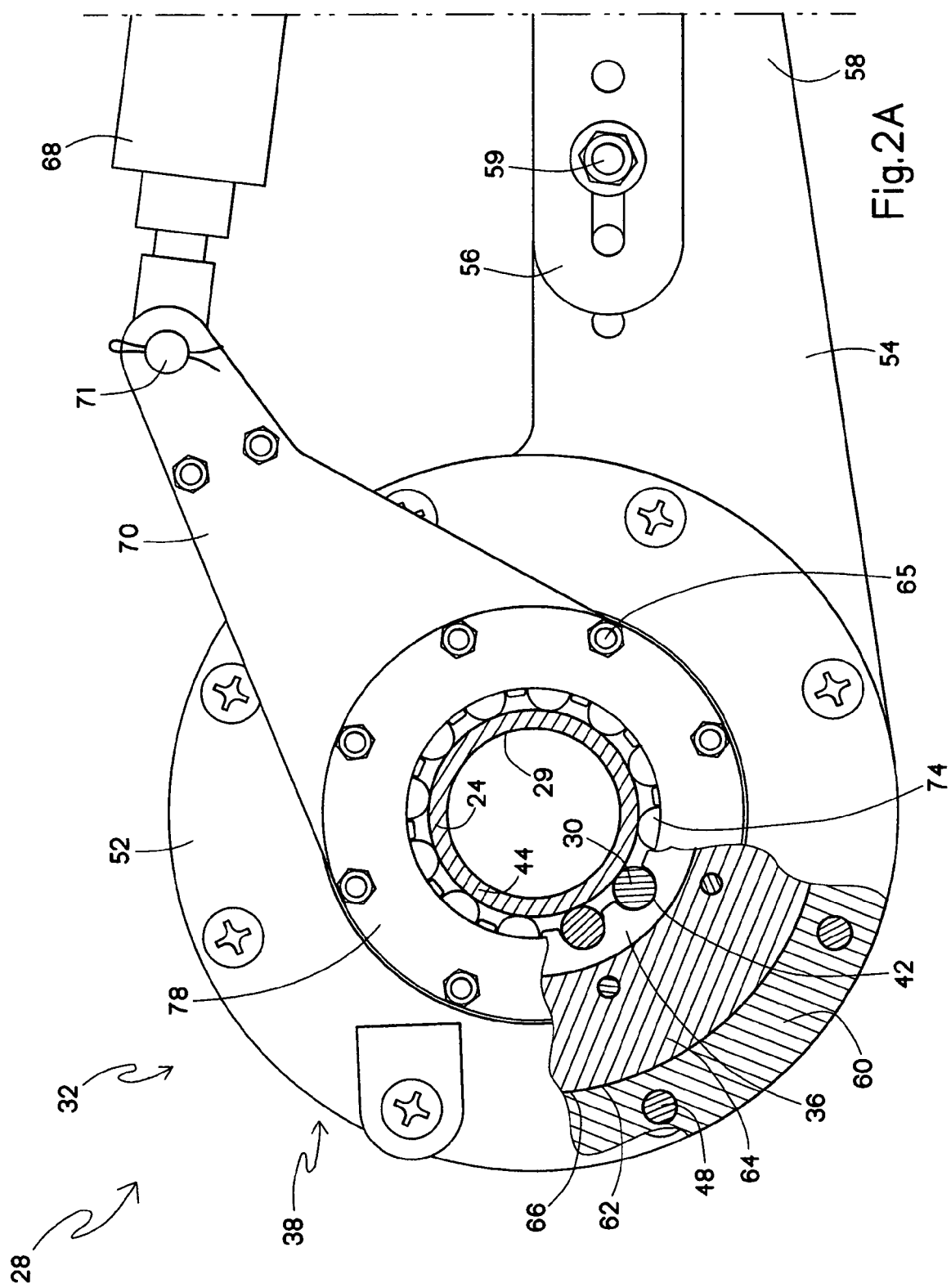
FIG. 2A is a front end elevational view of the housing portion of the constrictor valve of FIG. 1, with the valve in a relaxed position and partially cut away to reveal the captive ring and the rotating guide plate.
Figure 2B:
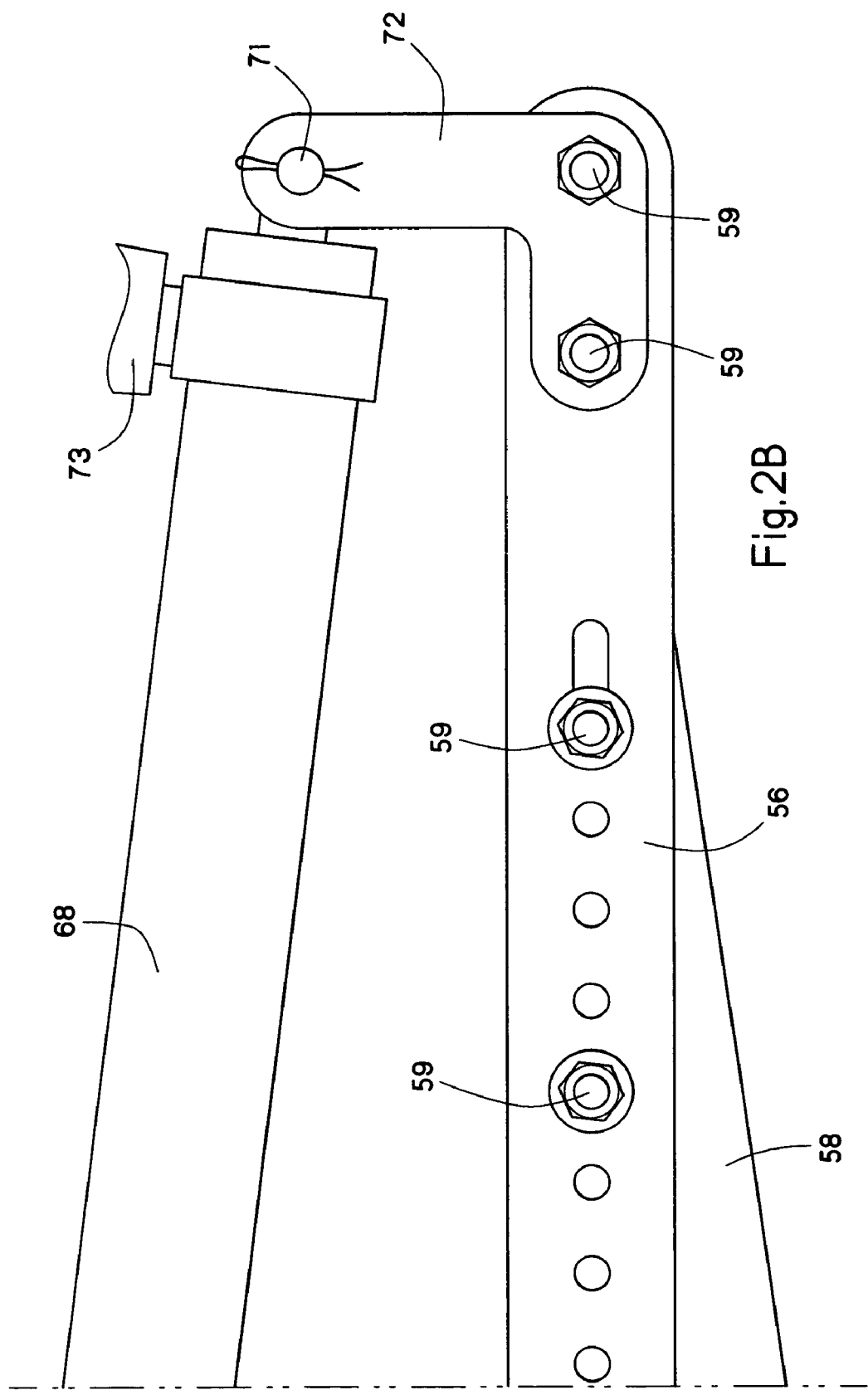
FIG. 2B is a front end elevational view of the actuator portion of the constrictor valve of FIG. 1, with the valve in a relaxed position.
Figure 3:
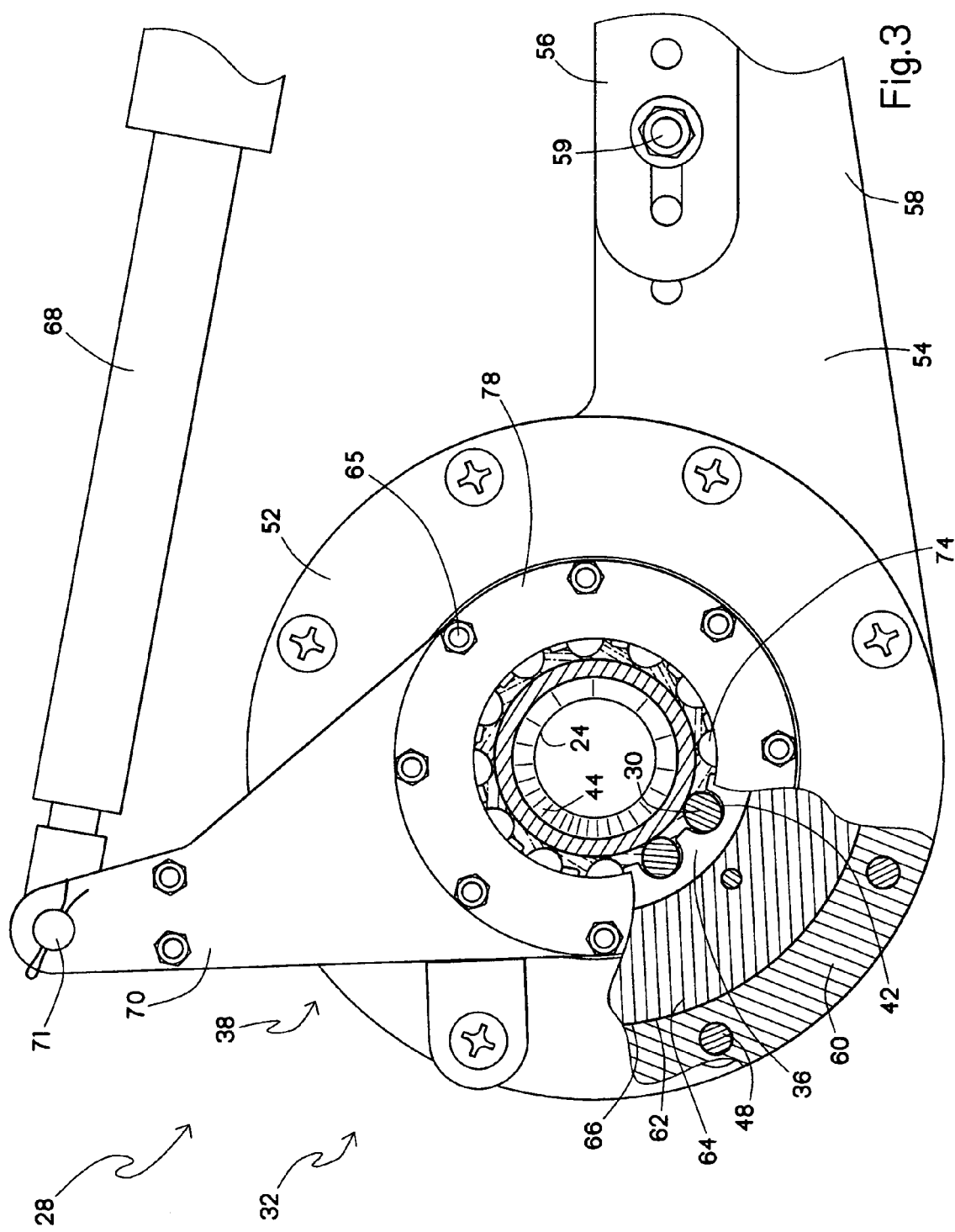
FIG. 3 is a front end elevational view of the housing portion of the constrictor valve of FIG. 1, with the valve in an actuated position and partially cut away to reveal the captive ring and the rotating guide plate.

Referring to FIGS. 1–3, the continuously variable valve, or constrictor valve 28 is coupled to the dispensing apparatus 22. The constrictor valve 28 variably reduces the flow through the orifice and increases the pressure drop as material flows through the orifice. Circumferentially disposed around the flexible conduit 24, the constrictor valve 28 has elongate members, preferably rigid rods 30, arrayed parallel to and circumscribing the flexible conduit in spaced relation to each other. The rigid rods 30 (best seen in FIGS. 4 and 5) are preferably formed of titanium, or other sufficiently strong materials for the specific application, and are preferably approximately nine inches long and a half-inch in diameter. It will be appreciated that different materials, lengths and sizes of the rods 30 may be used to suit the application. Further, it will be appreciated that the longer the length of the rod 30, the longer the length of the conduit 24 upon which forces can be exerted and thus, the smoother the flow through the orifice. However, excessively long rods 30 are prone to bending due to the relatively large forces involved.

Referring now to FIGS. 2–8, a housing 32 of the valve 28 is preferably generally cylindrical and preferably supports a fixed guide plate 34 (FIG. 4) and a rotating guide plate 36, although an alternate embodiment is contemplated in which both plates rotate. The rotating guide plate 36 and the fixed guide plate 34 are disposed on proximal and distal ends 38, 40 of the housing 32, respectively, in a spaced relationship from each other along the length of the conduit 24. Preferably formed of ⅜-inch aluminum sheet, the guide plates 34, 36 have a generally hollow-centered disk-like shape, with the inner radius preferably being approximately half the outer radius. The inner radius is sufficient to allow the conduit 24 to pass through the center of the guide plates 34, 36, with an additional clearance sufficient to permit the rigid rods 30 to extend therebetween.

Holding the rigid rods 30 in the arrayed position, elongate member engagers, preferably arcuate recesses or scallops 42 (best seen in FIG. 9), are formed on each of the annular guide plates 34, 36 at the inner periphery of the plates along the entire inner circumference. The rigid rods 30 are disposed in the concave recesses or scallops 42 (best seen in FIG. 2A) and are held in place by the flexible conduit 24. Other elongate member engagers are also contemplated, such as clips, ties, or any other configuration that couples the rods 30 to the guide plates 34, 36. Preferably, the longitudinal distance along the conduit 24 between the rotating guide plate 36 and the fixed guide plate 34 is about 7-inches when used with 9-inch length rigid rods 30. Having this spacing between the guide plates 34, 36 may vary with rod lengths.

In the preferred embodiment, each scallop 42 is slightly larger in diameter than the diameter of the rigid rods 30, and the scallops are preferably spaced apart from each other about the periphery of the plate 34, 36 a distance less than the diameter of the rods. Further, in the preferred embodiment, the distance between the scallops 42 is about ¼-inch. It should be appreciated, however, that the number of rods 30, thus the number of scallops 42, is dependent on the diameter of the conduit 24 used and the dimensions of the rigid rod used. It is preferred that the distance between the scallops 42 is less than the diameter of the rigid rods 30, and further, that the distance between the scallops is uniform around the inner circumference of the guide plates 34, 36 such that when pressure is imparted on the conduit 24, the conduit is uniformly deformed and maintains a generally circular shape. Since this generally circular shape of the conduit 24 is desirable in preventing clogging, it will be appreciated that any other shape of the rigid rod 30, such as tapered bars or any other shape is contemplated, which constricts the conduit while retaining the generally smooth, circular orifice 29.

Comparing now FIGS. 2A to 3, and 4 to 5, when the guide plates 34, 36 undergo relative rotation, the rigid rods 30 are maintained in the scallops 42 resulting in the rods appearing to twist around the flexible conduit 24 in a "wringing" action. It will be appreciated, however, that the rods 30 are approximately perfectly rigid, and the rods do not deform or deform only negligibly. The relative rotation of the guide plates 34, 36 results in the rigid rods 30 pushing down on the flexible conduit 24 to reduce the diameter of the conduit at the orifice without folding or other detrimental failure of the conduit. It will further be appreciated that during the relative rotating action, the rigid rods 30 are maintained in the scallops 42, but due to a small amount of play, the rods 30 change in orientation with respect to the guide plates 34, 36. Starting at a generally normal alignment to the guide plates 34, 36 (FIGS. 2A and 4), after relative rotation of the guide plates, each rod 30 becomes skewed from normal (FIGS. 3 and 5). At one guide plate 34, 36, the rods will become angled downward and to one side, while at the other guide plate 34, 36, the rod will have an equal and opposite orientation (seen generally in FIG. 5).

The relative rotation of the guide plates 34, 36 causes the rigid rods 30 to impart a constriction on the flexible conduit 24. The individual cross-sectional areas of the conduit 24, taken at locations along the length of the conduit, change in diameter but remain smooth and approximately round. The generally circular shape of the constricted orifice 29 is a result of the rigid rods 30 imparting pressure radially in multiple planes along the length of the conduit 24. Referring to FIGS. 3, 6 and 7, at the entrance to the valve 28, the cross-sectional area of the conduit 24 gradually decreases in diameter from an initial diameter of the conduit down to as much as approximately one-half the diameter (or any other desirable diameter) at the center of the valve. In situ testing has shown that an entrance angle, A (FIG. 7), with respect to the longitudinal axis of the conduit is optimal (with respect to smooth slurry flow and low clogging) at or less than about 12-degrees used in conjunction with a three inch conduit 24. However, given the multitude of factors involved in the non-Newtonian flow of a given slurry, having a given viscosity, and flowing through a given conduit, other angles are also contemplated which will provide a smooth transition into the Venturi and, further, will minimize internal obstructions which might provide a site for the collection and premature setting of slurry.

Referring now to FIG. 7, the resulting shape of the conduit 24 when the valve 28 is in an actuated position approximates a hyperboloid of rotation. That is, the curve of a conduit wall 44 resulting from the pressure imparted by the rigid rods 30 approximates a hyperbolic curve approaching its directrix. Further, if you take this hyperbola and rotate it about an axis which is 45-degrees from the directrix (the longitudinal axis of the conduit), you will get a hyperboloid of rotation. In this shape, not only is an approximately round flow channel created along the length of the conduit 24, but also a gradual tapering of diameter at the proximal and distal ends 38, 40 (the entrance and exit to the Venturi-shaped orifice) is created.

Figure 8:
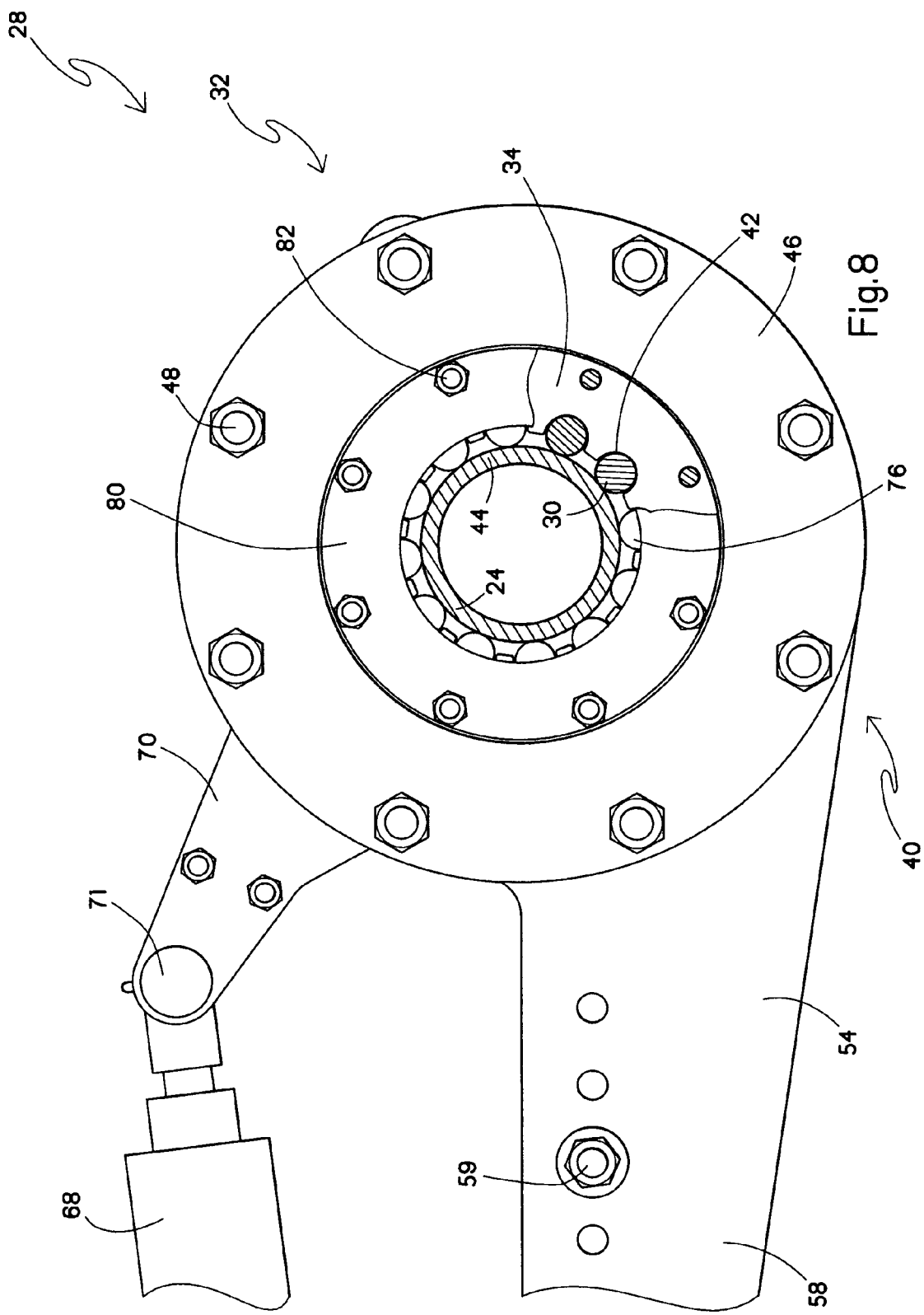
FIG. 8 is a back end elevational view of the constrictor valve of FIG. 1, with the valve in a relaxed position and partially cut away to reveal the fixed guide plate.

Referring now to FIGS. 3, 5 and 8, on the static, distal end 40 of the housing 32, the fixed guide plate 34 is fixed to a distal housing plate 46, preferably by using at least one but preferably a plurality of housing fasteners such as tie rods 48 spaced a distance apart around the outer periphery of the guide plate. Having a hollow-centered disc-shape which allows the conduit 24 and the rigid rods 30 to pass through, the distal housing plate 46 is preferably made of 14 gauge stainless steel. The distal housing plate 46 is in a fixed, spaced relationship with an inner housing plate 50 and an outer housing plate 52, which are both located at the proximal end 38 of the valve 28. Together, the three disk-shaped housing plates 46, 50 and 52 form the static housing 32 of the constrictor valve 28. The tie rods 48 maintain the fixed spacing between distal housing plate 46 and the inner and outer housing plates 50, 52. Further, the tie rods 48 are preferably arrayed on the outside periphery of the plates 46, 50, 52, in a number and location sufficient to maintain the static relationship of the plates. Additionally, although other fasteners and configurations are contemplated, it is preferable that the conduit 24 be readily observable through the constrictor valve 28.

Referring now to FIGS. 2A, 2B and 3, on the proximal end 38 of the housing 32, an arm 54 extending from the housing preferably has a minor arm component 56 and a major arm component 58, which are further preferably adjustably connected to each other such as with a bolt and hole configuration 59. At the end of the arm 54 is a middle disk 60 which extends between the inner and outer housing plates 50, 52 and is preferably generally flush with the housing plates. The middle disk 60 of the arm 54 is also static with respect to the housing plates 50, 52, and is preferably fastened to the housing plates by the tie rods 48. It is also contemplated, among other configurations, that the middle disk 60 is a washer or other spacer used to keep the inner and outer housing plates 50, 52 in a spaced relationship. The inner radius of the middle disk 60 not only circumscribes both the conduit 24 and the rods 30, but also is larger than the inner radii of the inner and outer housing plates 50, 52 to form a cavity 62 (FIGS. 2A and 3) between the housing plates 50, 52.

In the preferred embodiment, the rotating guide plate 36 is fixed to a captive plate 64 by at least one, but preferably a plurality of rotating guide plate fasteners 65. The captive plate 64 also circumscribes the conduit 24 and the rigid rods 30 such that the captive plate does not interfere with or impede the circumferential movement and angular skewing of the rigid rods. While the captive plate 64 is disposed in the cavity 62 between the inner and outer housing plates 50, 52, it is itself circumscribed by the middle disk 60. An inside edge of the middle disk 60 provides a generally circular interface 66 upon which the generally circular captive plate 64 can rotate within the cavity 62. It is contemplated that a lubricant may be added to the clearance between the captive plate 64 and the middle disk 60 to facilitate the sliding engagement of the captive plate with the interface 66. Since the captive plate 64 and the rotating guide plate 36 are fixed together by the rotating guide plate fasteners 65, they rotate together in a single motion.

In the preferred embodiment, disposed between the middle disk 60 and the inner housing plate 46 is a spacer structure such as a plurality of washers 67 (FIGS. 4 and 5), which gives the captive plate 64 additional space to rotate within the cavity 62. Alternately, other configurations are contemplated which facilitate the rotation of the captive plate 64 and the rotating guide plate 36 in the cavity 62 without interference from the inner and outer housing plates 50, 52.

The rotation of the captive plate 64 and the rotating guide plate 36 is effected by the use of an actuator 68, such as a commercially available linear actuator by Duff-Norton®, or any other mechanical device, such as a lever, or fluid power cylinder, as is known in the art. The actuator 68 is pivotally connected to an attachment member 70 with a rotating joint, such as with a pin connected joint 71, which preferably couples the actuator to both the captive plate 64 and the rotating guide plate 36 by the plurality of rotating guide plate fasteners 65.

At the other end of the actuator 68 (FIG. 2B), the actuator 68 is preferably coupled to the arm 54 with a coupling link 72. The coupling link 72 is preferably attached to the arm 54 in the bolt and hole configuration 59. On the other end, the coupling link 72 is preferably pivotally attached with a pin connected joint 71 to a controller 73, such as a computer or a potentiometer, which controls the drive of the actuator 68. Automatic or manual adjustment of the actuator 68 is contemplated, as is known in the art. In addition, continuous adjustment is also contemplated and is preferably regulated by a feedback loop, or any other known method. Constriction of the valve 28 may be triggered by the controller 73 sensing one or a plurality of factors, such as the electromotive loading on the mixer motor 13, the flow rate through the dispensing system 22, the pressure in the mixing or dispensing system, the viscosity of the slurry, the electromotive loading on the actuator 68, or any other factor. Further, controllable, reproducible precision in the amount of constriction of the conduit can be achieved with the actuator configuration since the amount of constriction of the conduit is directly related to the amount of rotation of the guide plate.

When the actuator 66 is actuated to extend linearly, the attachment member 70 rotates the captive plate 64, and thus the rotating guide plate 36, within the cavity 62 and upon the circular interface 66 of the middle disk 60. More specifically, the rotation is generally about the longitudinal axis of the conduit 24. When the rotating guide plate 36 rotates, a first end 74 of the rigid rods 30 disposed within the scallops 42 follows the path of rotation of the rotating guide plate 36, while a second opposite end 76 (FIGS. 4 and 5) of the rigid rods is not circumferentially displaced. This "wringing" action is what imparts pressure on the flexible conduit 24. Also, it is the rotation of at least one of the guide plates 34, 36 which results in the conduit having a generally smooth and circular shape in a plurality of cross-sections taken along the length of the conduit 24. Further, in the preferred embodiment, and as seen in planar view in FIG. 7, each and every cross section of the conduit 24 taken along the length of the conduit and normal to the longitudinal axis is generally smooth and circular in shape.

To maintain the rods 30 within the guide plates 34, 36, a proximal keeper plate 78 (FIG. 2A) and a distal keeper plate 80 (FIG. 5) are preferably disposed at the proximal end 38 and the distal end 40 of the constrictor valve 28, respectively. Having a hollow-centered disk-shape which preferably circumscribes the conduit 24 only, the keeper plates 78, 80 prevent the rigid rods 30 from sliding out of the guide plates 34, 36. The keeper plates 78, 80 are preferably disposed in a spaced relationship with the guide plates 34, 36, the distance between the two keeper plates 78, 80 preferably being slightly longer than the length of the rods 30. The keeper plates 78, 80 are preferably fastened to the guide plates 34, 36 by the rotating guide plate fastener 65 and a fixed guide plate fastener 82. However, it is also contemplated that the keeper plates are fastened to the housing 32, or that the keeper plates are omitted, assuming some other way is employed to retain the rods 30 in operational relationship with the guide plates 34, 36.

In the preferred embodiment and referring to FIG. 9, the fasteners 65 attach the proximal keeper plate 78, the attachment member 70, the captive plate 64 and the rotating guide plate 36 in a static relationship with respect to one another. Upon actuation of the actuator 68, the attachment member 70, the proximal keeper plate 78, the captive plate 64 and the rotating guide plate 36 rotate in a single motion about the longitudinal axis at the center of the conduit 24.

To assemble the constrictor valve 28, the conduit 24 must be fed through the housing 32, the guide plates 34, 36, the middle disk 60, the captive plate 64, and the keeper plates 78, 80, and the rods 30 must be positioned in the scallops 42 between the conduit 24 and the guide plates. Once the rods 30 are in place, the keeper plates 78, 80 can be fastened at both ends 38, 40. Although the valve 28 preferably includes hollow-centered disk shaped plates, it is also contemplated that the valve can be any other shape or configuration that has a static housing and enables the "wringing" action.

In the preferred embodiment, the fixed guide plate 34 and the rotating guide plate 36 are preferably easily interchangeable with different sized guide plates to accommodate different sized conduits 24. Since the guide plates 34, 36 are the only disk-shaped plates that require the inside diameter to be generally coextensive with the diameter of the conduit 24, as long as the housing plates 46, 50, 52 and the captive plate 64 have an inside diameter sufficient to accommodate a range of conduit sizes, only the guide plates 34, 36 and the keeper plates 78, 80 may be required to be changed to accommodate different sized conduits. The fixed and rotating guide plates 34, 36 are removably fastened to the distal housing plate 46 and the captive plate 64, respectively, and are changed with minimal disassembly. By unfastening the fastener 82 coupling the fixed guide plate 34 to the distal housing plate 46, and the fastener 65 coupling the rotating guide plate 36 to the captive plate 64, the two guide plates and the two keeper plates 78, 80 can be readily interchanged without modifying the remaining valve housing 32.

A typical mixer 12 of the type used with the present invention generates a slurry velocity in the approximate range of 500–3000 ft/min, measured at the discharge gate or outlet 20 with a corresponding force or pressure. The amount of flow through the dispensing system 22 in relation to the amount of material being input into the mixer 12 and the retention time of the material in the mixer, dictates the level of material in the mixer. The level of the material dictates the pressure head in the dispensing system 22. When the pressure is increased, entrained air is reduced in the slurry. To increase or decrease this pressure to a desired amount, the pressure drop through the valve orifice can be variably reduced or increased by constricting the conduit 24 through the actuator 68.

While specific embodiments of the constrictor valve of the present invention have been shown and described, it will be appreciated by those skilled in the art that changes and modifications may be made thereto without departing from the invention in its broader aspects and as set forth in the following claims.

What is claimed is:

1. A constrictor valve for use in constricting a flexible, resilient conduit in a gypsum slurry dispensing assembly, comprising:
   a first guide plate and a second guide plate spaced a distance apart along the length of the conduit, wherein one of said guide plates rotates generally about the longitudinal axis of the conduit with respect to the second of said guide plates; and
   a plurality of elongate members having a first end engaged on said first guide plate, and a second end engaged on said second guide plate, wherein upon rotation of at least one of said first and second guide plates, said elongate members are configured to impart pressure on and constrict the conduit.

2. The constrictor valve of claim 1 wherein said rotation of said at least one guide plate results in the circumferential displacement of said first end of said elongate members relative to said second end.

3. The constrictor valve of claim 2 wherein said elongate members impart pressure on and constrict the conduit radially in multiple planes along the length of the conduit.

4. The constrictor valve of claim 1 wherein upon rotation of said at least one guide plate the resulting shape of the conduit approximates a hyperboloid of rotation about the longitudinal axis of the conduit.

5. The constrictor valve of claim 1 wherein upon rotation of said at least one guide plate the resulting shape of the conduit is generally smooth and circular in a plurality of cross-sections taken along the length of the conduit.

6. The constrictor valve of claim 1 wherein the valve is configured for creating back pressure in the mixer and for reducing build up of slurry in the valve.

7. The constrictor valve of claim 1 further comprising a housing which circumscribes the conduit and is static with respect to at least one of said guide plates.

8. The constrictor valve of claim 1 wherein the valve is one of manually or automatically, continuously variable.

9. The constrictor valve of claim 1 further comprising an actuator configured to rotate said first guide plate relative to said second guide plate.

10. A constrictor valve for use in constricting a flexible, resilient conduit in a gypsum wallboard dispensing assembly, comprising:
    a plurality of elongate members arrayed around the conduit which are configured to be circumferentially displaced and impart pressure on the conduit, wherein the resulting shape of the conduit approximates a hyperboloid of rotation about the longitudinal axis of the conduit.

11. The constrictor valve of claim 10 further comprising a first guide plate and a second guide plate spaced a distance apart along the length of the conduit, wherein said guide plates are configured to circumferentially displace said elongate members.

12. In a wallboard manufacturing system, a constrictor valve on a flexible conduit for use in dispensing a slurry onto a wallboard forming surface, comprising:
    a plurality of elongate members arrayed around the conduit and having a first end and a second end, wherein said plurality of members are configured to impart pressure on said conduit by the relative circumferential displacement of said first end relative to said second end.

13. The apparatus of claim 12 further comprising a plurality of guide plates in a spaced relationship to each other, wherein said guide plates rotate with respect to each other.

14. The apparatus of claim 13 further comprising a housing that fixedly supports one of said plurality of guide plates.

15. The apparatus of claim 12 wherein upon rotation of said at least one guide plate the resulting shape of the conduit approximates a hyperboloid of rotation.

16. The apparatus of claim 12 wherein upon rotation of said at least one guide plate the resulting shape is generally smooth and circular in a plurality of cross-sections taken along the length of the conduit.

17. The apparatus of claim 12 wherein upon rotation of said at least one guide plate said elongate members impart pressure on and constrict the conduit in multiple planes along the length of the conduit.

18. A guide plate for use in a constrictor valve that circumscribes a flexible, resilient conduit, comprising:
   an inner peripheral edge which is configured to circumscribe the conduit;
   a plurality of elongate member engagers disposed near said inner peripheral edge configured to engage a plurality of elongate members;
   wherein the guide plate is configured to rotate generally about the longitudinal axis of the conduit.

19. The apparatus of claim 18 wherein the elongate member engagers are scallops.

20. The apparatus of claim 18 further comprising an outer peripheral edge configured to slidingly engage and rotate in a constrictor valve.

* * * * *